(12) United States Patent
Maekawa

(10) Patent No.: US 10,884,322 B2
(45) Date of Patent: Jan. 5, 2021

(54) IMAGING DEVICE

(71) Applicant: CANON KABUSHIKI KAISHA, Tokyo (JP)

(72) Inventor: Shigeshi Maekawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/451,398

(22) Filed: Jun. 25, 2019

(65) Prior Publication Data
US 2019/0310534 A1    Oct. 10, 2019

Related U.S. Application Data

(63) Continuation of application No. PCT/JP2017/047164, filed on Dec. 28, 2017.

(30) Foreign Application Priority Data

Jan. 13, 2017 (JP) .................................. 2017-004260

(51) Int. Cl.
*G03B 17/14* (2006.01)
*H04N 5/225* (2006.01)
*G03B 17/02* (2006.01)

(52) U.S. Cl.
CPC ............. *G03B 17/14* (2013.01); *G03B 17/02* (2013.01); *H04N 5/225* (2013.01);
(Continued)

(58) Field of Classification Search
CPC ...... G03B 17/14; G03B 17/02; H04N 5/2254; H04N 5/2257
(Continued)

(56) References Cited

U.S. PATENT DOCUMENTS 4,572,638 A * 2/1986 Nakai ...................... G03B 7/20
348/E5.044
4,733,258 A * 3/1988 Kojima .................. G03B 17/14
396/71
(Continued)

FOREIGN PATENT DOCUMENTS

JP    2000-022998 A    1/2000
JP    2009-163209 A    7/2009
(Continued)

OTHER PUBLICATIONS

Mar. 27, 2018 International Search Report in International Patent Appln. No. PCT/JP2017/047164.

*Primary Examiner* — Clayton E. LaBalle
*Assistant Examiner* — Kevin C Butler
(74) *Attorney, Agent, or Firm* — Venable LLP

(57) ABSTRACT

Provided is an imaging device including a lens mounting portion, which is a portion on which or from which an interchangeable lens is mountable or removable, an imaging element, and an optical system provided in a light path between the interchangeable lens and the imaging element in a state in which the interchangeable lens is mounted on the lens mounting portion. The optical system is disposed at a first position at which an image of a light flux from the optical system is formed on the imaging element at a position in the light path between the interchangeable lens and the imaging element, and is moved to a second position, which is different from the first position from the first position in association with an operation of removing the interchangeable lens from the lens mounting portion.

10 Claims, 14 Drawing Sheets

(52) U.S. Cl.
CPC ......... *H04N 5/2253* (2013.01); *H04N 5/2254* (2013.01); *H04N 5/2257* (2013.01)

(58) Field of Classification Search
USPC ........................................................ 359/529
See application file for complete search history.

(56) References Cited

U.S. PATENT DOCUMENTS

| | | | | |
|---|---|---|---|---|
| 4,758,854 A * | 7/1988 | Saegusa | ................ | G03B 17/14 396/529 |
| 4,963,910 A * | 10/1990 | Ishimura | ................ | G02B 7/28 396/125 |
| 5,214,464 A * | 5/1993 | Karasaki | ................ | G02B 7/346 396/121 |
| 5,748,999 A * | 5/1998 | Ueda | ................ | G03B 17/14 396/91 |
| 5,765,055 A * | 6/1998 | Miyazawa | ............ | G03B 17/14 396/137 |
| 5,809,354 A * | 9/1998 | Miyazawa | ............ | G03B 17/14 396/301 |
| 5,822,632 A * | 10/1998 | Miyazawa | ............ | G03B 17/14 396/529 |
| 6,704,053 B1 * | 3/2004 | Niikawa | ............... | H04N 5/2254 348/335 |
| 6,707,992 B2 * | 3/2004 | Uenaka | ................ | G02B 27/646 396/529 |
| 6,734,912 B1 * | 5/2004 | Kanayama | ......... | H04N 5/23209 348/222.1 |
| 7,467,900 B2 * | 12/2008 | Higuma | ................... | G03B 7/20 348/E5.044 |
| 8,408,822 B2 | 4/2013 | Hasuda | | |
| 2006/0165401 A1 * | 7/2006 | Doi | ........................ | G03B 17/56 396/71 |
| 2009/0154915 A1 * | 6/2009 | Hasuda | .................. | G03B 17/02 396/535 |
| 2011/0299847 A1 * | 12/2011 | Sakamoto | ............. | G03B 17/14 396/529 |
| 2012/0033955 A1 * | 2/2012 | Okada | .................. | G03B 17/565 396/71 |
| 2012/0044407 A1 * | 2/2012 | Murashima | ........... | G03B 13/36 348/345 |
| 2012/0163786 A1 * | 6/2012 | Murashima | ........... | G03B 13/36 396/91 |
| 2015/0070521 A1 * | 3/2015 | Yasuda | ................ | G03B 17/565 348/211.1 |

FOREIGN PATENT DOCUMENTS

| | | | | |
|---|---|---|---|---|
| JP | 2009163209 | * | 7/2009 | ............. G03B 11/04 |
| JP | 2010-062833 A | | 3/2010 | |
| JP | 2010062833 | * | 3/2010 | ............. H04N 5/225 |
| JP | 2011-017808 A | | 1/2011 | |
| JP | 2012-220545 A | | 11/2012 | |
| JP | 2012220545 | * | 11/2012 | ............. G03B 17/02 |
| JP | 2014-052605 A | | 3/2014 | |
| JP | 2014052605 | * | 3/2014 | ............. G03B 17/14 |

* cited by examiner

IMAGING DEVICE

CROSS-REFERENCE TO RELATED APPLICATIONS

This application is a Continuation of International Patent Application No. PCT/JP2017/047164, filed Dec. 28, 2017, which claims the benefit of Japanese Patent Application No. 2017-004260, filed Jan. 13, 2017. The contents of these applications are hereby incorporated by reference herein in their entirety.

BACKGROUND OF THE INVENTION

Field of the Invention

The present invention relates to an imaging device.

Background Art

Imaging devices such as lens interchangeable digital cameras have been proposed. In order to miniaturize these imaging devices, it is conceivable that imaging elements such as a CCD and a CMOS be miniaturized. However, if imaging is performed by an interchangeable lens made for an imaging element size, which has been widely used in a video camera, being mounted on a camera main body, only some of rays of light from the interchangeable lens are received by an imaging element, and thus an angle of view is narrowed. Therefore, in order to increase an angle of view, an imaging device including a converter lens inside a camera main body has been proposed. In addition, an imaging device including a converter lens has a widened angle of view, and an F-number of the entire optical system including an interchangeable lens and the converter lens is decreased, and thus imaging can be performed with high brightness. Therefore, an ISO sensitivity can be minimized in the imaging device even under a dark imaging environment and imaging with less noise can be performed. Patent Document 1 discloses a digital camera in which a converter lens which is an optical system provided between an interchangeable lens and an imaging element is driven by an electric motor depending on the type of interchangeable lens.

CITATION LIST

Patent Literature

Patent Literature 1: Japanese Patent Laid-Open No. 2000-22998

However, in an imaging device including a converter lens, there is a problem that an imaging element may be burned due to sunlight condensing on the imaging element in a case where an interchangeable lens is removed from a camera main body, or the like. Since the digital camera disclosed in Patent Document 1 drives the converter lens using electric power of the electric motor, it is difficult to prevent the imaging element from being burned during non-electrification of the imaging device such as a case where the interchangeable lens is removed from the camera main body. An object of the present invention is to provide an imaging device capable of preventing an imaging element from being burned due to a light flux through an optical system provided between an interchangeable lens and the imaging element even when the interchangeable lens is removed from a camera main body.

SUMMARY OF THE INVENTION

According to an embodiment of the present invention, there is provided an imaging device including a lens mounting portion, which is a portion on which or from which an interchangeable lens is mountable or removable, an imaging element, and an optical system provided in a light path between the interchangeable lens and the imaging element in a state in which the interchangeable lens is mounted on the lens mounting portion, in which the optical system is disposed at a first position at which an image of a light flux from the optical system is formed on the imaging element at a position in the light path between the interchangeable lens and the imaging element, and is moved to a second position, which is different from the first position, from the first position in association with an operation of removing the interchangeable lens from the lens mounting portion.

According to an imaging device of the present invention, it is possible to prevent an imaging element from being burned due to a light flux through an optical system provided between an interchangeable lens and the imaging element even when the interchangeable lens is removed from a camera main body.

Further features of the present invention will become apparent from the following description of exemplary embodiments with reference to the attached drawings.

DESCRIPTION OF THE EMBODIMENTS

Figure 1A:
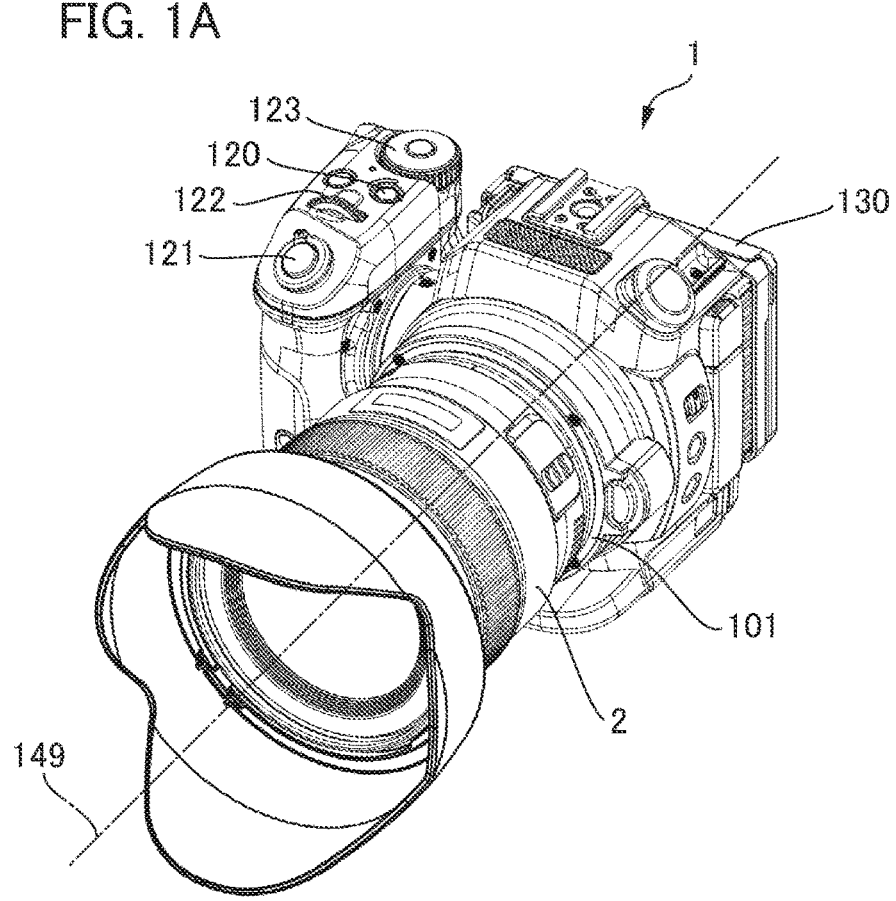
FIGS. 1A and 1B are perspective views illustrating the appearance of an imaging device.
Figure 1B:
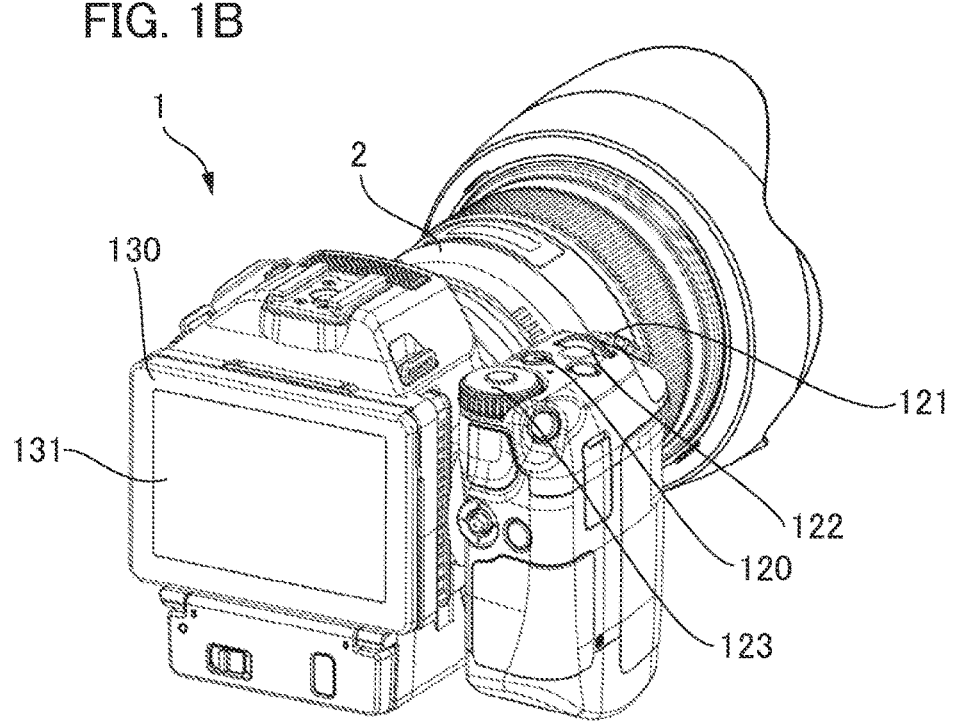

FIGS. 1A and 1B are perspective views illustrating the appearance of an imaging device of the present embodiment.

Figure 2:
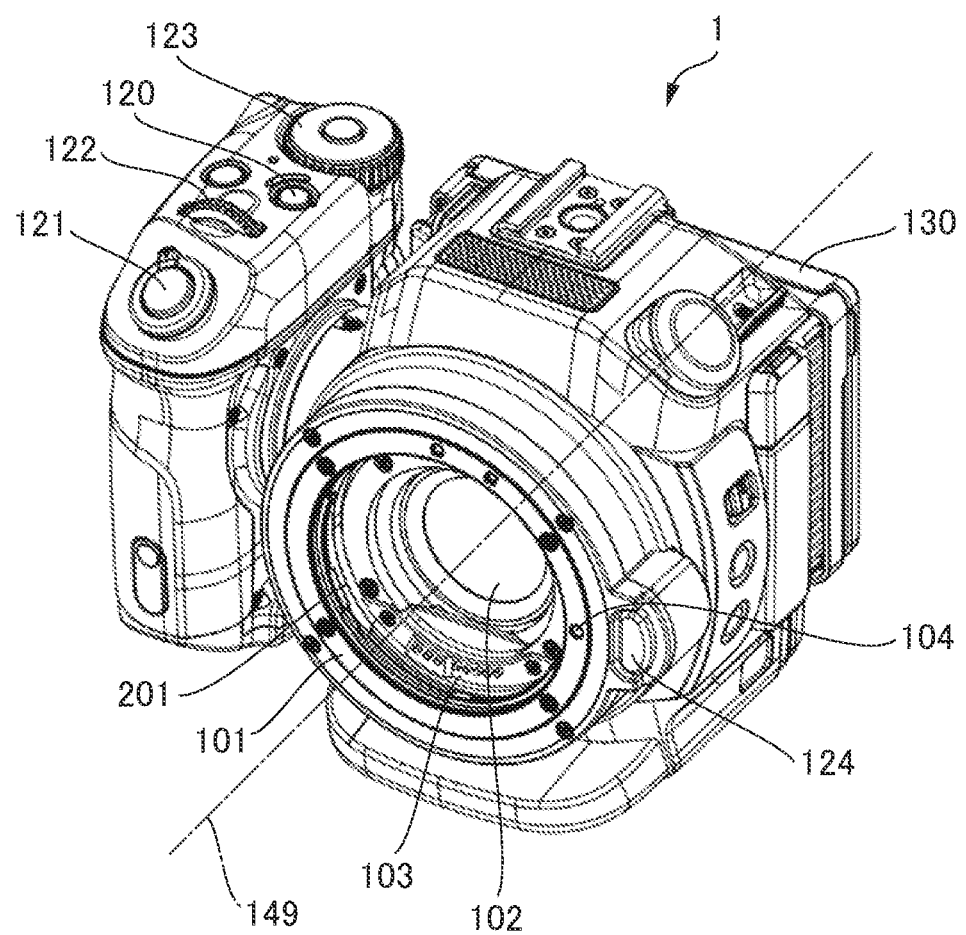
FIG. 2 is a perspective view illustrating the appearance of the imaging device in a state where an interchangeable lens has been removed.

FIG. 1A illustrates a state where an imaging device 1 is viewed from a subject side on a side thereabove. FIG. 1B illustrates a state where the imaging device 1 is viewed from a photographer side on a side thereabove. In addition, FIG. 2 is a perspective view illustrating the appearance of the imaging device in a state in which an interchangeable lens is removed.

The imaging device 1 is a lens interchangeable digital video camera. As illustrated in FIGS. 1 and 2, the imaging device 1 includes an interchangeable lens 2 of a bayonet system and a lens mounting portion 101 corresponding to a bayonet system. The lens mounting portion 101 is a portion on which and from which the interchangeable lens 2 is mountable and removable. The interchangeable lens 2 rotates centering on the optical axis when mounted on or removed from the lens mounting portion 101.

The lens mounting portion 101 is fixed to a lens mounting fixing member 201 disposed inside the imaging device 1. In addition, a converter lens 102 (FIG. 2) as an optical system is provided between the lens mounting portion 101 and an imaging element 110 (FIG. 3) to be described later and on an optical axis 149 connecting the lens mounting portion 101 and the center of the imaging element 110.

In addition, a locking portion 104 for stopping the rotation of the interchangeable lens 2 at the time of installing the interchangeable lens 2 in the imaging device 1 is provided on the lens mounting portion 101. A lens release button 124 is biased by a biasing member such as a spring, not shown in the drawing, which is integrally formed with the locking portion 104 to be continuous with the locking portion 104. When the lens release button 124 is pressed, the locking portion 104 is operated in a direction of the optical axis 149 in association with the pressing operation, so that locking is released from a concave portion 404 (FIG. 4) of the interchangeable lens 2, and thus it is possible to rotate and remove the interchangeable lens 2.

A power supply button 120 and a recording (REC) button 121 are provided on a left side of the imaging device 1 when seen from the subject side. When the power supply button 120 is pressed in a power OFF state, a power ON state is set, which allows imaging to be performed. When the power ON state is set, a through image of imaging is displayed on a display panel 131 of a panel unit 130 which is installed on the rear side of the imaging device 1. A rotation dial 122 is provided on the left side of the imaging device 1. It is possible to change a set F-number by rotating the rotation dial 122. In addition, a mode selection dial 123 is provided on the left side of the imaging device 1. It is possible to change an imaging mode by rotating the mode selection dial 123. In the present embodiment, the converter lens 102 of the imaging device 1 reduces rays of light to approximately 0.65 times using a lens group constituted by a plurality of optical members and forms an image on the imaging element 110 having a 1-inch size of approximately 13.2 mm by approximately 8.8 mm.

Figure 3:
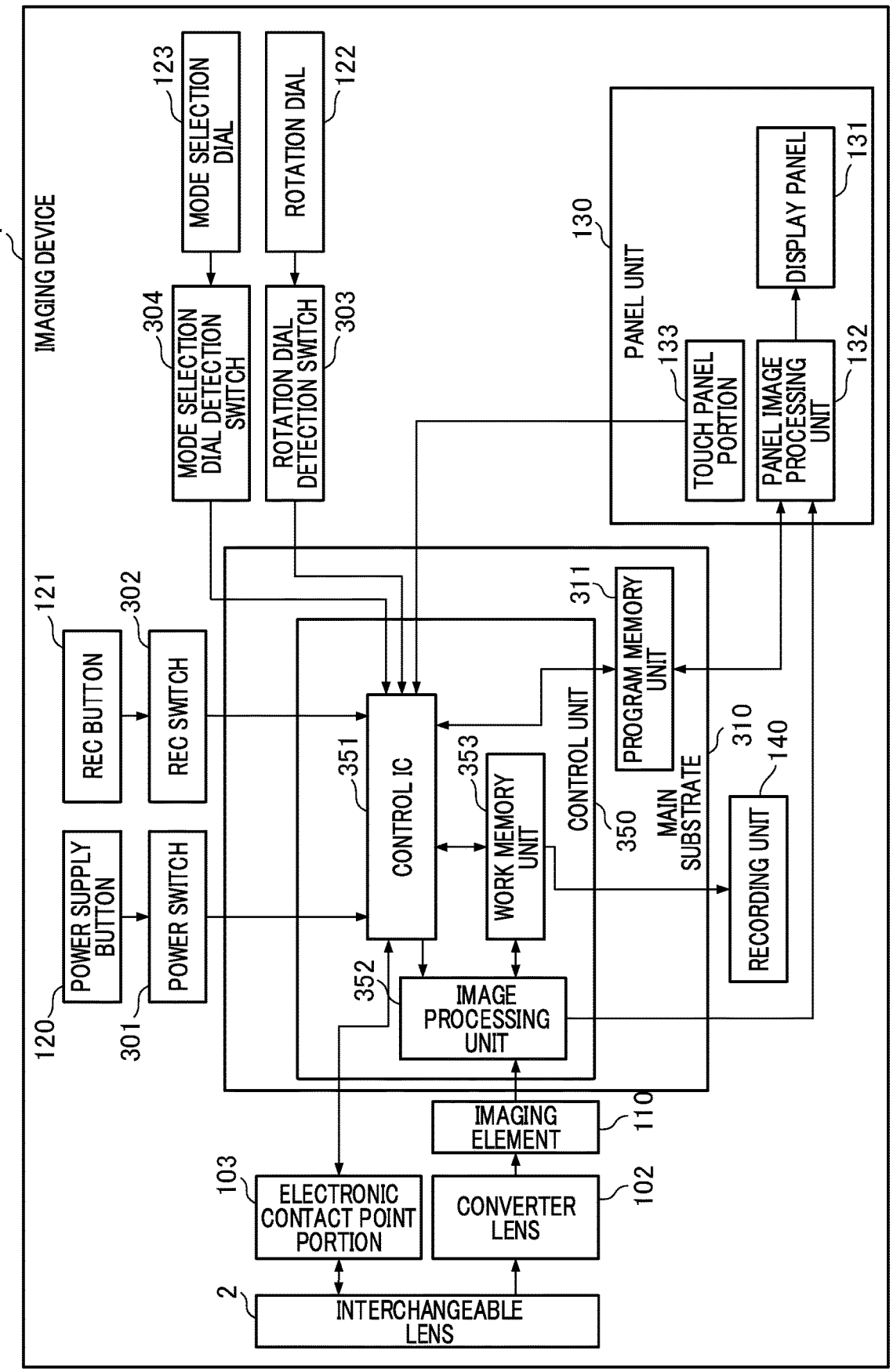
FIG. 3 illustrates an example of a functional block diagram of the imaging device.

FIG. 3 illustrates an example of a functional block diagram of the imaging device.

The imaging device 1 includes the interchangeable lens 2 to a work memory unit 353. When a user operates the power supply button 120 provided in the imaging device 1, a power switch 301 is pressed and a signal indicating that the power switch 301 has been pressed is transmitted to a control IC 351. Thereby, the power supply of the imaging device 1 is turned on, and thus a standby state is set. When the user presses the REC button 121 in the standby state, a REC switch 302 detects that the REC button 121 has been pressed. Thereby, a recording process is started, so that the writing of digital video data in the recording unit 140 is started. When the user presses the REC button 121 again in this state, the recording process is terminated and the state returns to a standby state, so that writing of digital video data in the recording unit 140 is terminated.

An electronic contact point portion 103 performs data communication with the interchangeable lens 2. The control IC 351 is a CPU and controls the entire imaging device 1. Specifically, the control IC 351 transmits power to the interchangeable lens 2 through the electronic contact point portion 103, receives lens identification information from the interchangeable lens 2, and performs data communication such as transmission of a control signal of an autofocus or an F-number to the interchangeable lens 2. If the power supply of the imaging device 1 is turned on in a state where the interchangeable lens 2 is mounted or when the interchangeable lens 2 is mounted in a state where the power supply of the imaging device 1 is turned on, power is first supplied to the interchangeable lens 2 through the electronic contact point portion 103. The interchangeable lens 2 supplied with power transmits lens identification information of the interchangeable lens 2 to the imaging device 1. The control IC 351 receives the lens identification information from the electronic contact point portion 103 and acquires the equivalent lens identification information from a lens identification information group which is stored in a program memory unit 311 in advance.

The control IC 351 acquires information of a limit F-number associated with lens identification information from the program memory unit 311. The information of the limit F-number is information having the smallest F-number in which a decrease in the amount of peripheral light is inconspicuous after the amount of peripheral light is corrected by the imaging device 1 including the converter lens 102. The control IC 351 transmits a control signal which is set to a value equal to or greater than the limit F-number to the interchangeable lens 2 through the electronic contact point portion 103 to control an F-number.

The F-number can be changed by operating the rotation dial 122. When the user rotates the rotation dial 122 in a standby state or during REC, a rotation dial detection switch 303 detects the operation. The rotation dial detection switch 303 transmits a detection signal to the control IC 351, and the control IC 351 changes an F-number on the basis of the amount of rotation of the rotation dial 122 in the range of the F-number equal to or greater than the limit F-number.

A light flux having passed through the interchangeable lens 2 and the converter lens 102 is photoelectrically converted into an electrical signal by the imaging element 110. The electrical signal obtained through the photoelectric conversion is input to a control unit 350 of a main substrate 310. An image processing unit 352 included in the control unit 350 converts a signal charge transmitted from the imaging element 110 into digital video data of a luminance signal and a color signal. The work memory unit 353 which is a volatile storage unit is used as a work area of the control IC 351.

In addition, the control IC 351 acquires peripheral light amount compensation data associated with a lens identification information group from the program memory unit 311 and transmits the peripheral light amount compensation data to the image processing unit 352. The image processing unit 352 performs peripheral light amount compensation on an electrical signal which is output by the imaging element 110 and then converts the electrical signal having been subjected to the peripheral light amount compensation into digital video data on the basis of the peripheral light amount compensation data. The converted digital video data is temporarily recorded in the work memory unit 353 and is recorded in the recording unit 140 under the control of the control IC 351. The digital video data is transmitted from the image processing unit 352 to a panel image processing unit 132 provided in the panel unit 130. The digital video data transmitted to the panel image processing unit 132 is converted into a format for performing display on the display panel 131. In addition, the display panel 131 displays the digital video data as a through image at the time of imaging. Meanwhile, various icons stored in the program memory unit 311 in advance can also be displayed on the display panel 131.

Figure 4:
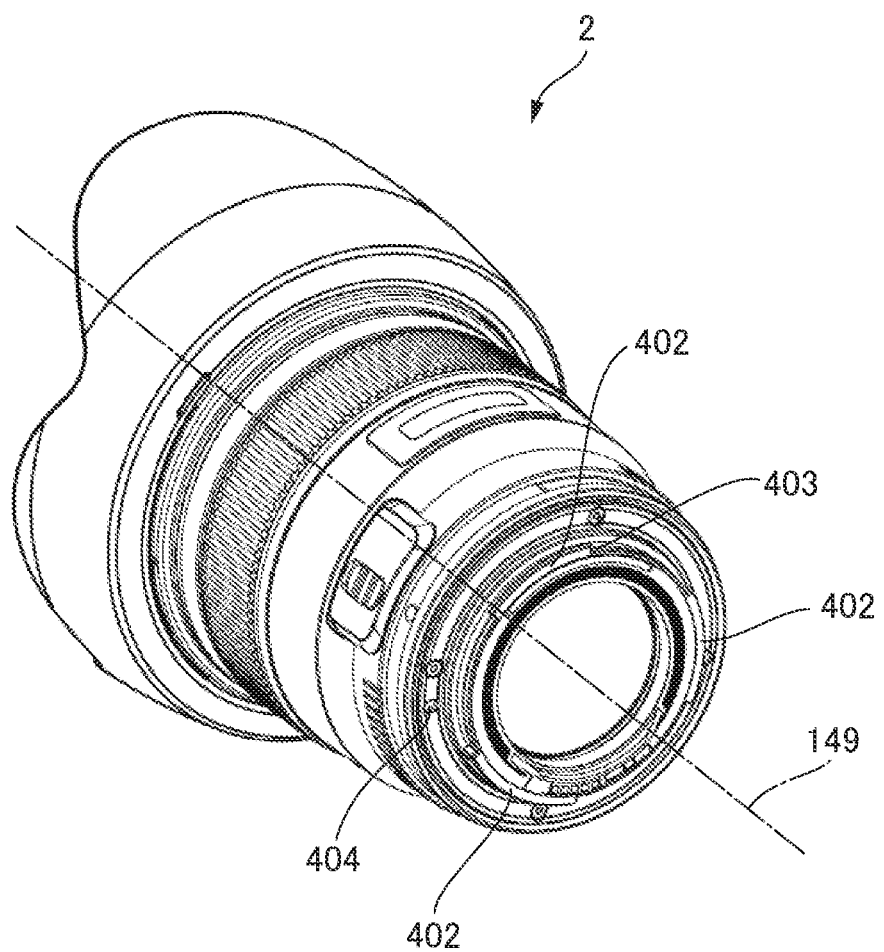
FIG. 4 is a perspective view of an interchangeable lens when viewed from the rear of an optical axis.
Figure 5A:
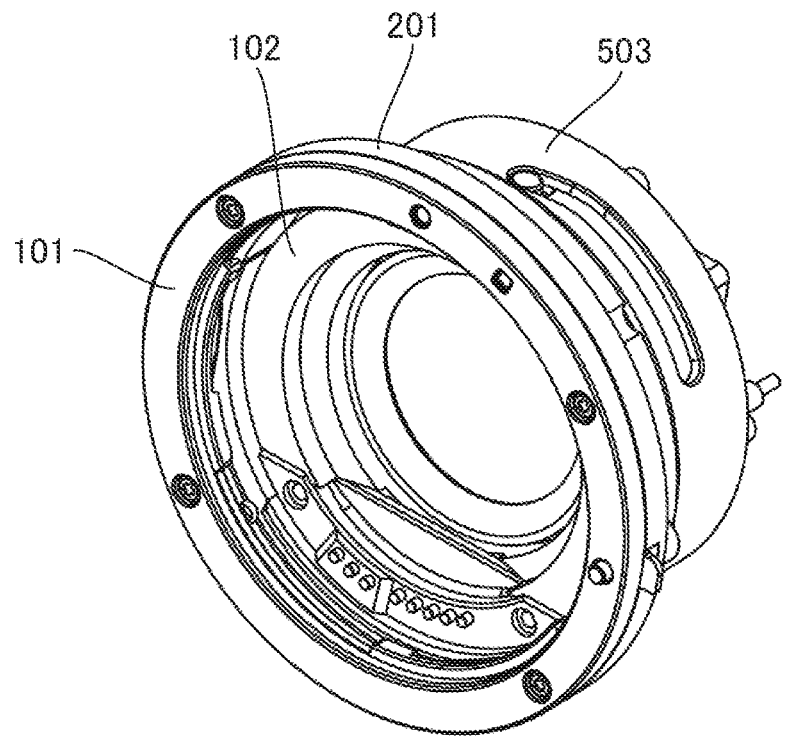
FIGS. 5A and 5B are perspective views of a main configuration of the imaging device.
Figure 5B:
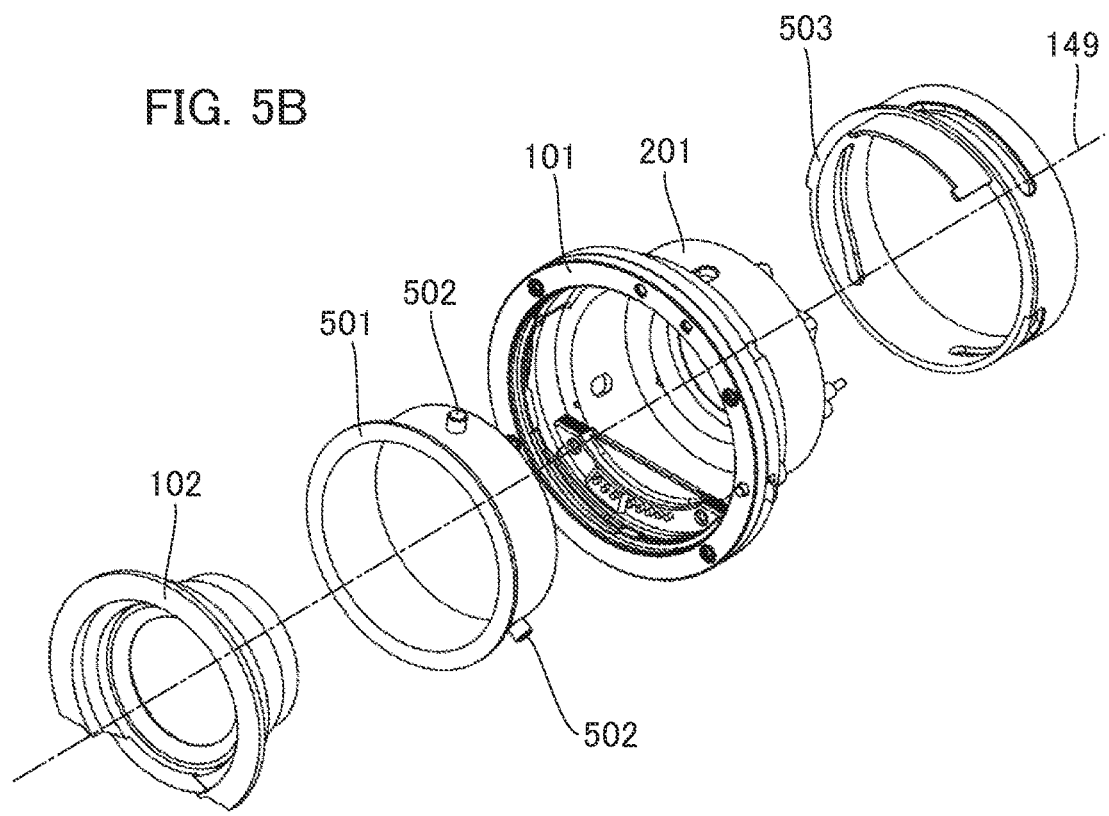
Figure 6A:
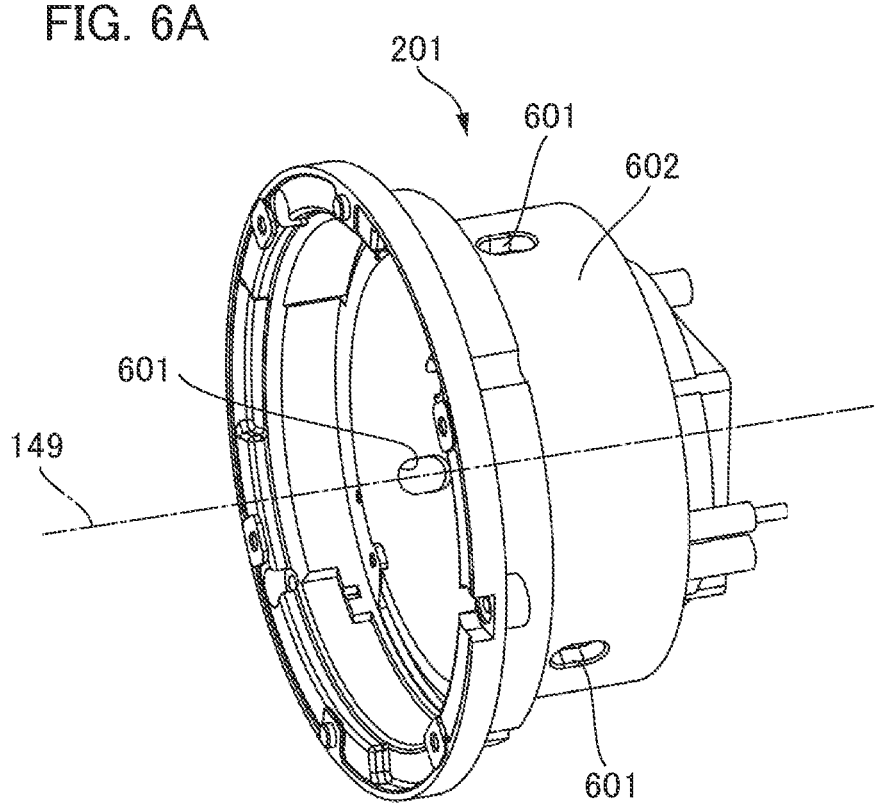
FIGS. 6A and 6B are diagrams illustrating a configuration of a lens mounting fixing member.
Figure 6B:
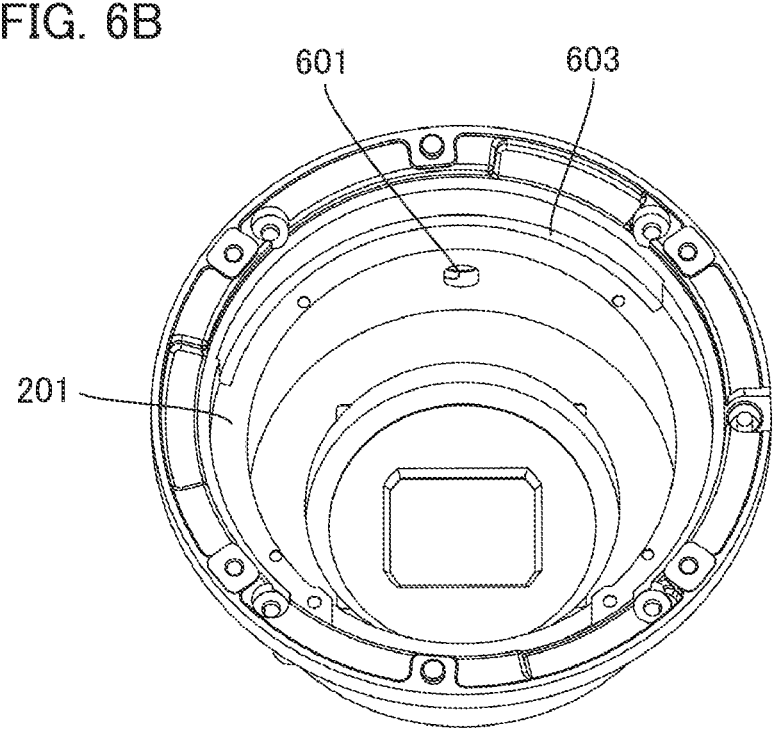
Figure 7A:
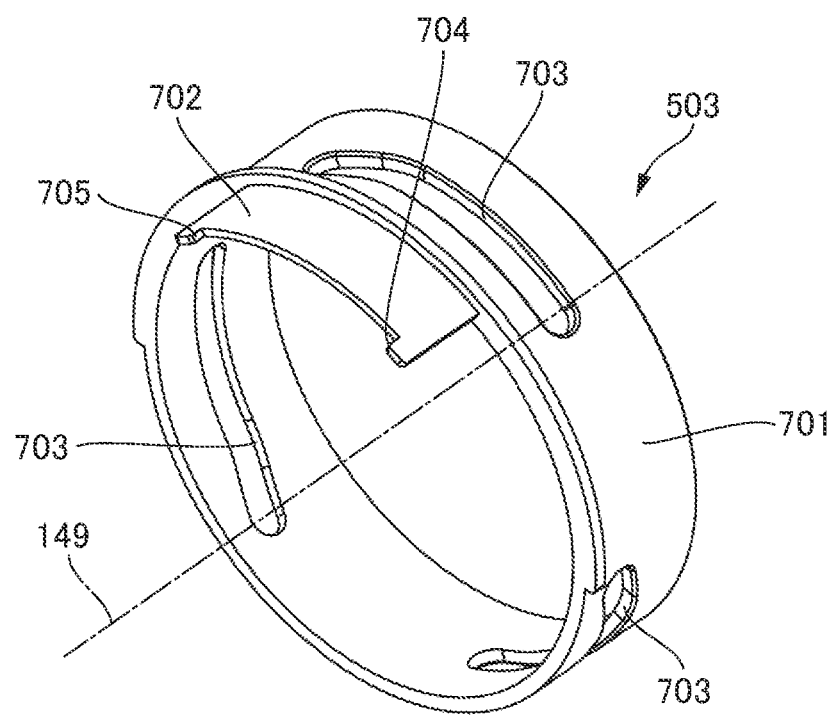
FIGS. 7A and 7B are perspective views of a converter lens driving member.
Figure 7B:
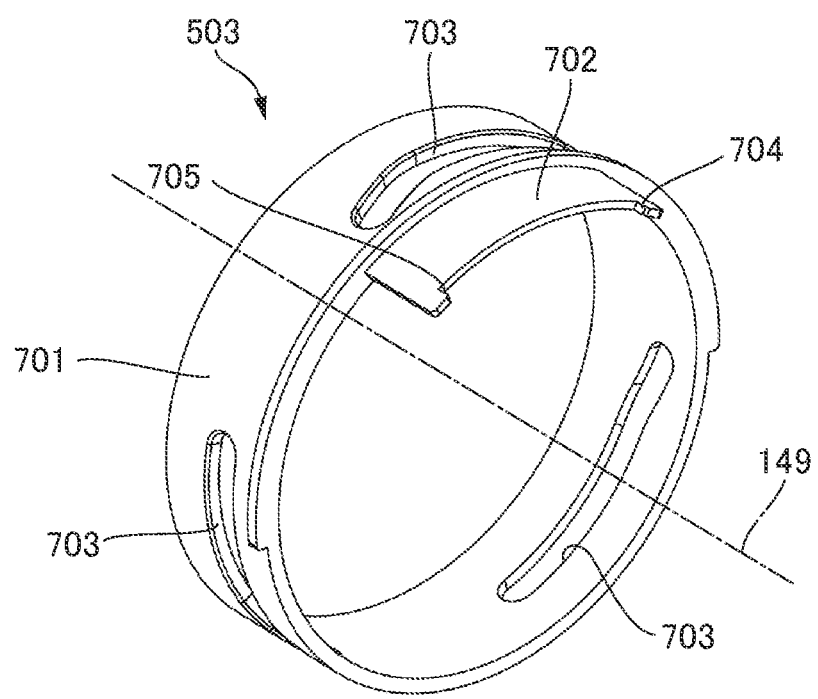

FIG. 4 is a perspective view of an interchangeable lens when viewed from the rear side of an optical axis. FIGS. 5A and 5B are perspective views of a main configuration of the imaging device 1. FIGS. 6A and 6B are diagrams illustrating a configuration of a lens mounting fixing member. FIGS. 7A and 7B are perspective views of a converter lens driving member.

The interchangeable lens 2 is provided with a lens-side mounting member 401 (FIG. 9) which is fitted to the lens mounting portion 101 (FIG. 5A) provided in the imaging device 1. The lens-side mounting member 401 includes a bayonet claw portion 402, an abutting portion 403 which is a portion of the bayonet claw portion 402, and a concave portion 404 that holds the interchangeable lens 2 by engaging with the locking portion 104 of the imaging device 1 illustrated in FIG. 4.

As illustrated in FIG. 5B, the converter lens 102 is held (fixed) by a converter lens holding member 501 using a fastening member such as a screw. Guide pins 502 which are protrusion portions are provided on the outer circumferential surface of the converter lens holding member 501 at a plurality of locations at predetermined intervals. In the present embodiment, the guide pins 502 are disposed around the optical axis 149 at three locations at equal intervals of 120 degrees.

In addition, as illustrated in FIG. 6A, guide grooves 601 which are first groove portions are disposed in the lens mounting fixing member 201 at a plurality of locations at predetermined intervals. In the present embodiment, the guide grooves 601 are disposed around the optical axis 149 at three locations at equal intervals of 120 degrees. Thereby, the guide pins 502 of the converter lens holding member 501 (FIG. 5B) is slidable. In addition, a converter lens driving member 503 is rotatably fitted to a driving member fitting portion 602 at the rear of the lens mounting fixing member 201.

In addition, as illustrated in FIG. 6B, a portion of the converter lens driving member 503 to be described later is inserted into the lens mounting fixing member 201, and a driving member insertion portion 603 is provided to protrude inside the lens mounting fixing member 201. The driving member insertion portion 603 is open to penetrate the lens mounting fixing member 201.

In addition, as illustrated in FIGS. 7A and 7B, the converter lens driving member 503 includes a cylindrical portion 701 and a bayonet claw engagement portion 702. The cylindrical portion 701 is rotatably fitted to the driving member fitting portion 602 of the lens mounting fixing member 201. In addition, the bayonet claw engagement portion 702 engages with the bayonet claw portion 402 of the interchangeable lens 2 with a bayonet system. With such a configuration, it is possible to drive the converter lens driving member 503.

Guide cam grooves 703 which are second groove portions are disposed at a plurality of locations to penetrate the outer circumferential surface of the cylindrical portion 701. The guide pin 502 (FIG. 5B) is inserted into the guide cam groove 703. Thereby, the converter lens holding member 501 is driven in association with an operation of mounting the interchangeable lens 2 and an operation of removing the interchangeable lens 2. The shape of the guide cam groove 703 will be described later. The bayonet claw engagement portion 702 includes an abutting portion 704 at the time of mounting and an abutting portion 705 at the time of separation. The abutting portion 704 at the time of mounting abuts on the abutting portion 403 of the bayonet claw portion 402 when the interchangeable lens 2 is mounted on the imaging device 1. The abutting portion 705 at the time of separation abuts on a side opposite to the abutting portion 403 of the bayonet claw portion 402 when the interchangeable lens 2 is separated therefrom, that is, removed from the imaging device 1. The guide pin 502 is inserted into both the guide groove 601 of the lens mounting fixing member 201 and the guide cam groove 703 of the converter lens driving member 503.

Figure 8A:
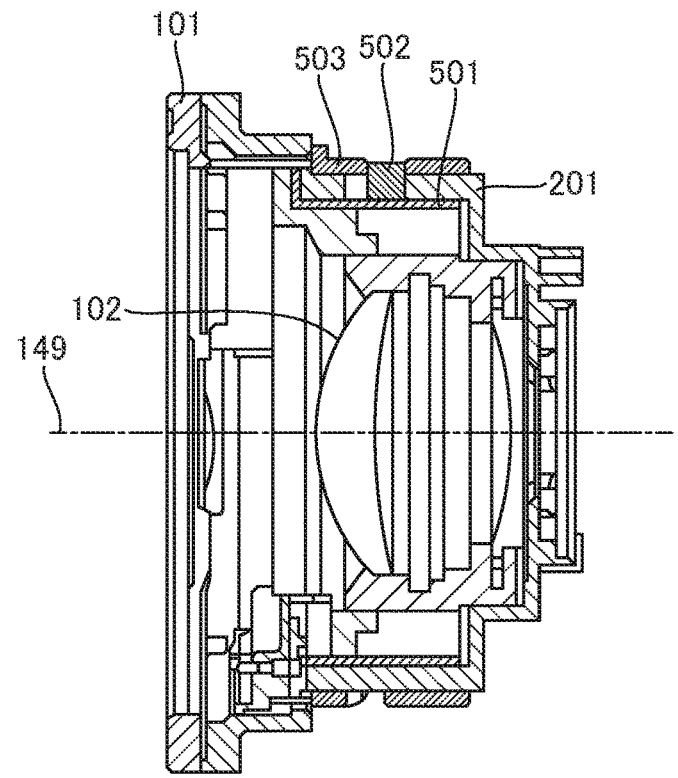
FIGS. 8A and 8B cross-sectional views of a converter lens driving mechanism.
Figure 8B:
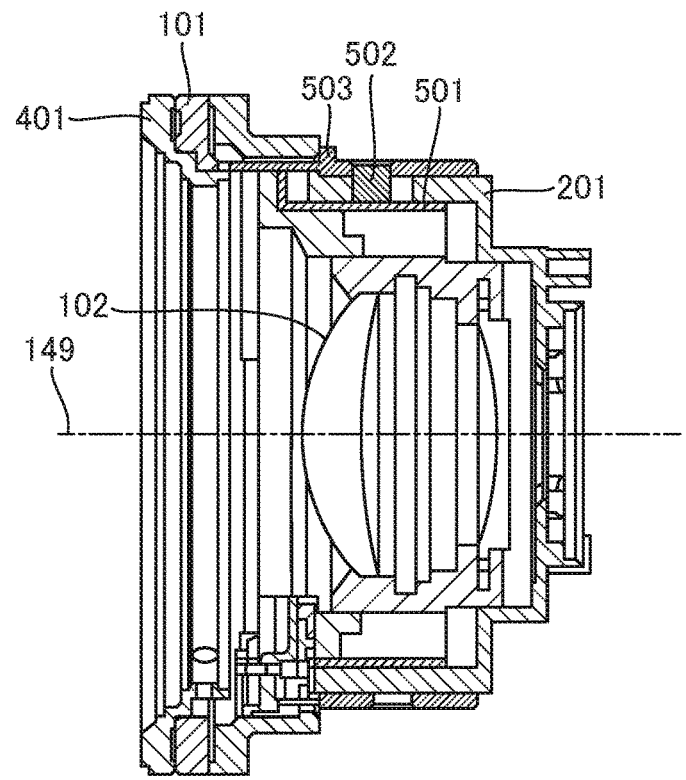

FIGS. 8A and 8B are cross-sectional views of a converter lens driving mechanism.

FIG. 8A illustrates the converter lens driving mechanism in a state where the interchangeable lens is removed from the imaging device. FIG. 8B illustrates the converter lens driving mechanism in a state where the interchangeable lens is fixed to the imaging device. Meanwhile, in FIG. 8B and the subsequent drawings, a lens tube portion of the interchangeable lens 2 is omitted, and only the lens-side mounting member 401 fixed to the imaging device 1 is illustrated.

If the interchangeable lens 2 illustrated in FIG. 8A is removed from the imaging device 1, the converter lens 102 is moved (retreated) to a position which is not a predetermined optical position. When the interchangeable lens 2 is mounted and fixed to the imaging device 1, the converter lens 102 is disposed at a predetermined optical position illustrated in FIG. 8B. Hereinafter, the operation of the converter lens driving mechanism will be described by taking a case where the interchangeable lens 2 is mounted on the imaging device 1 as an example.

Figure 9:
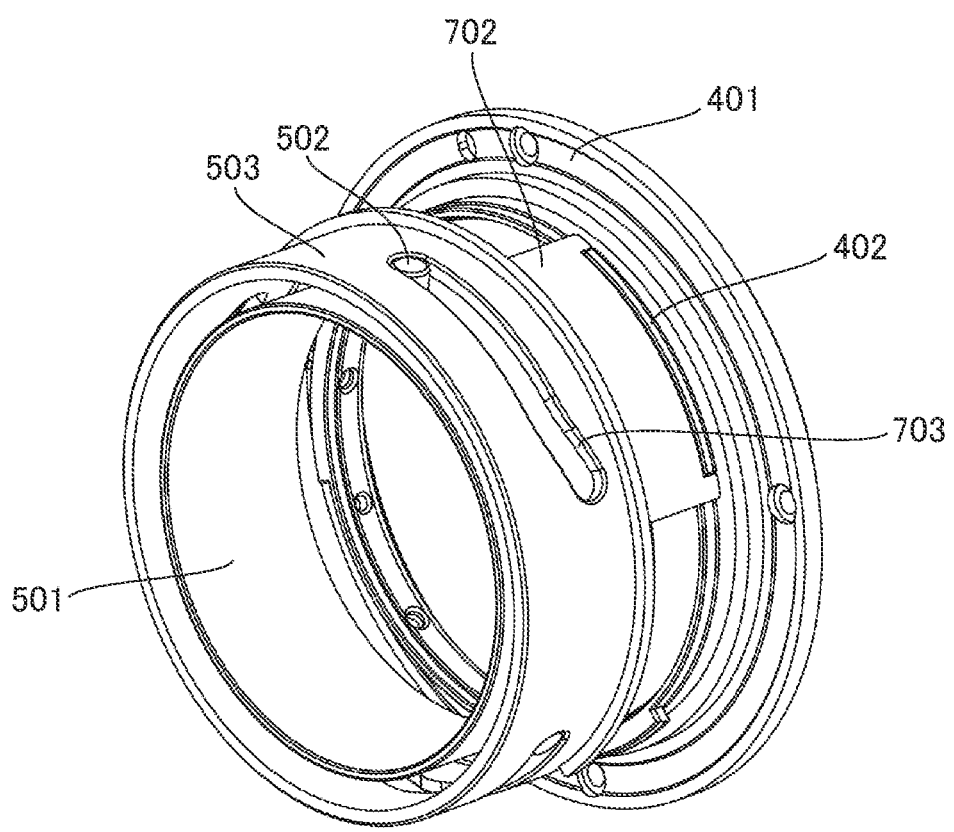
FIG. 9 is a diagram illustrating a state where the interchangeable lens and the converter lens driving member engage with each other.
Figure 11:
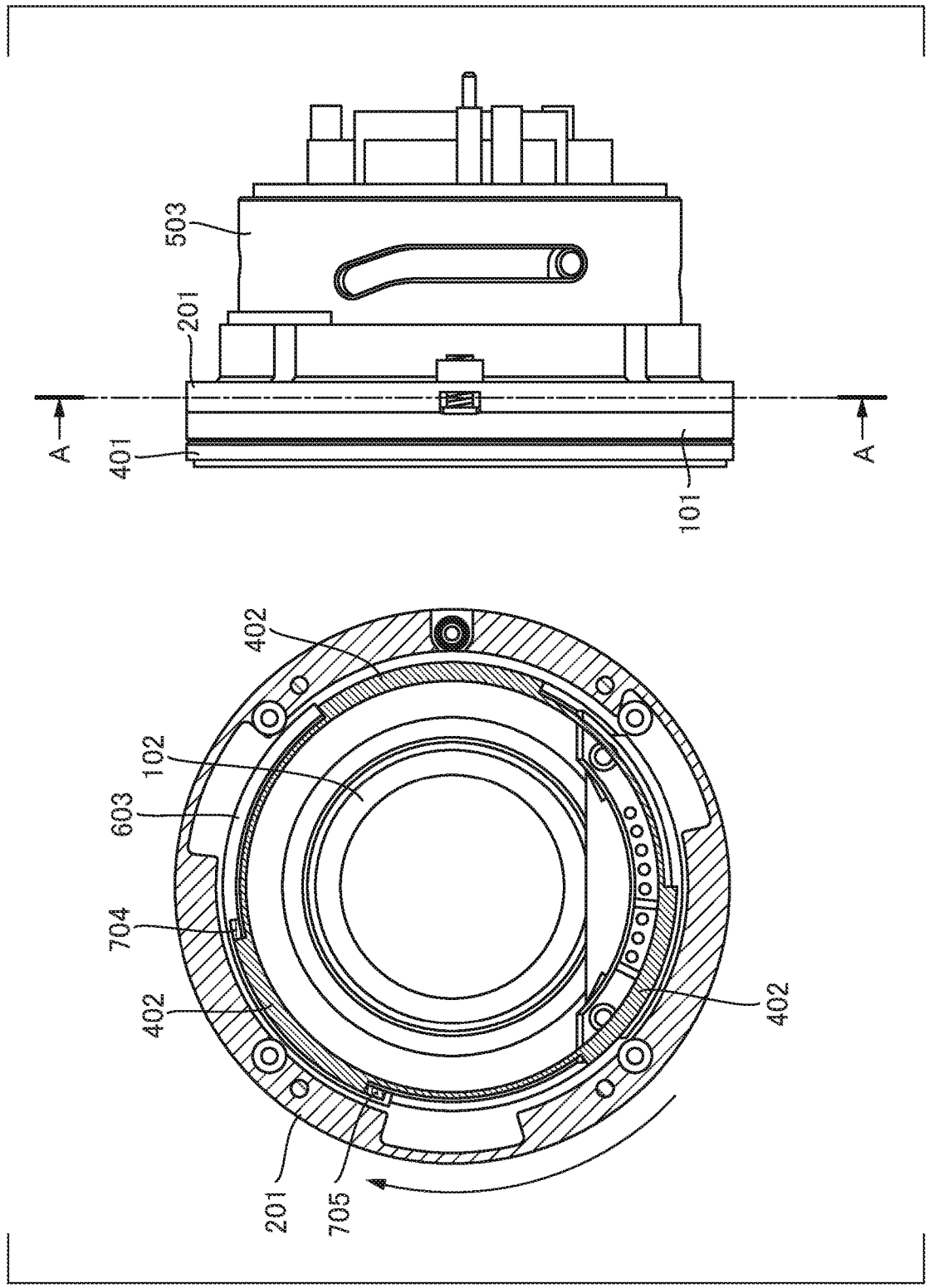
FIG. 11 is a diagram illustrating mounting of the interchangeable lens on the imaging device.
Figure 12:
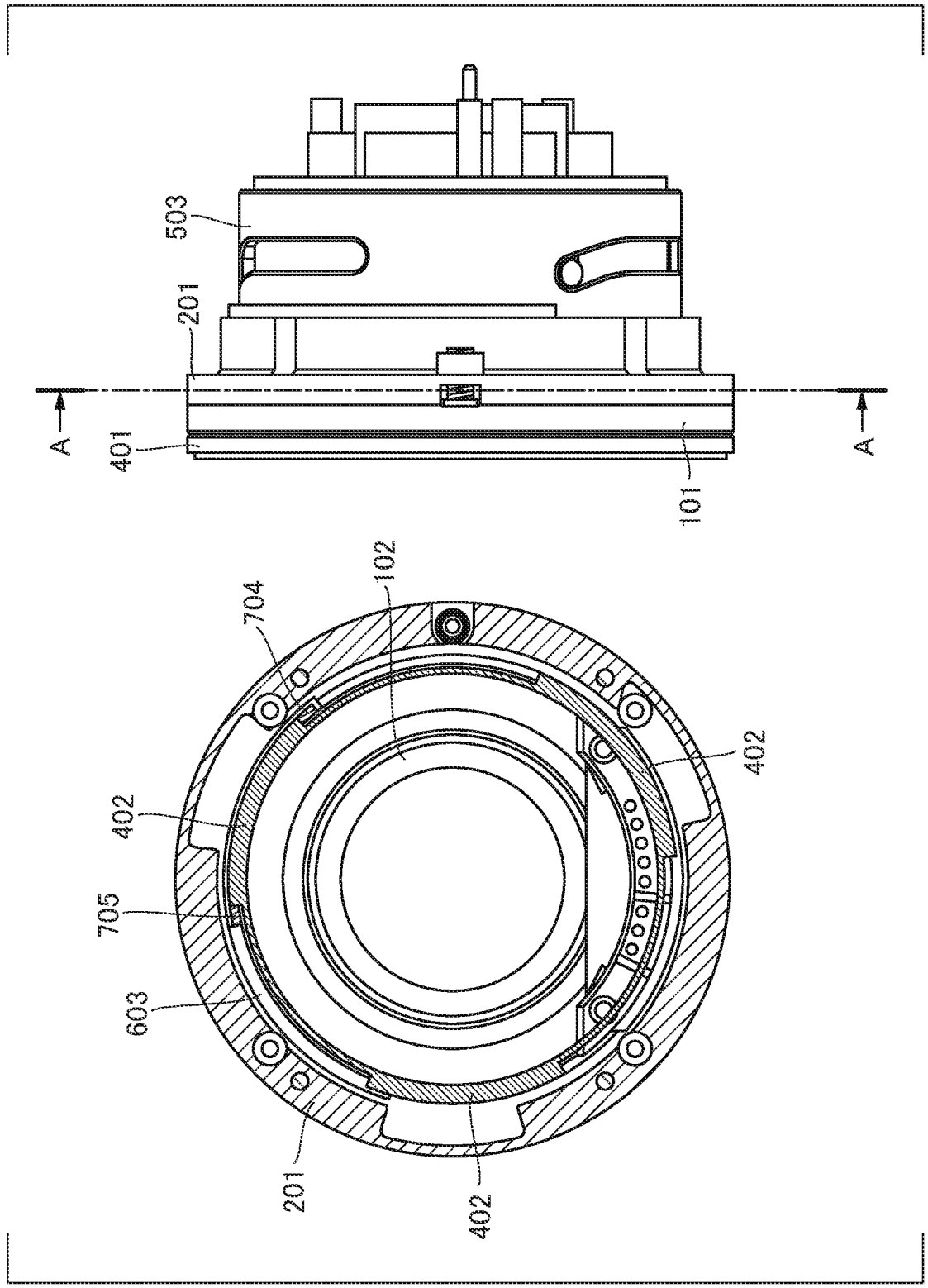
FIG. 12 is a diagram illustrating mounting of the interchangeable lens on the imaging device.

FIG. 9 is a diagram illustrating a state where the lens-side mounting member 401 of the interchangeable lens 2 engages with the converter lens driving member 503. In addition, FIGS. 10 to 12 are diagrams illustrating mounting of the interchangeable lens on the imaging device.

Figure 10:
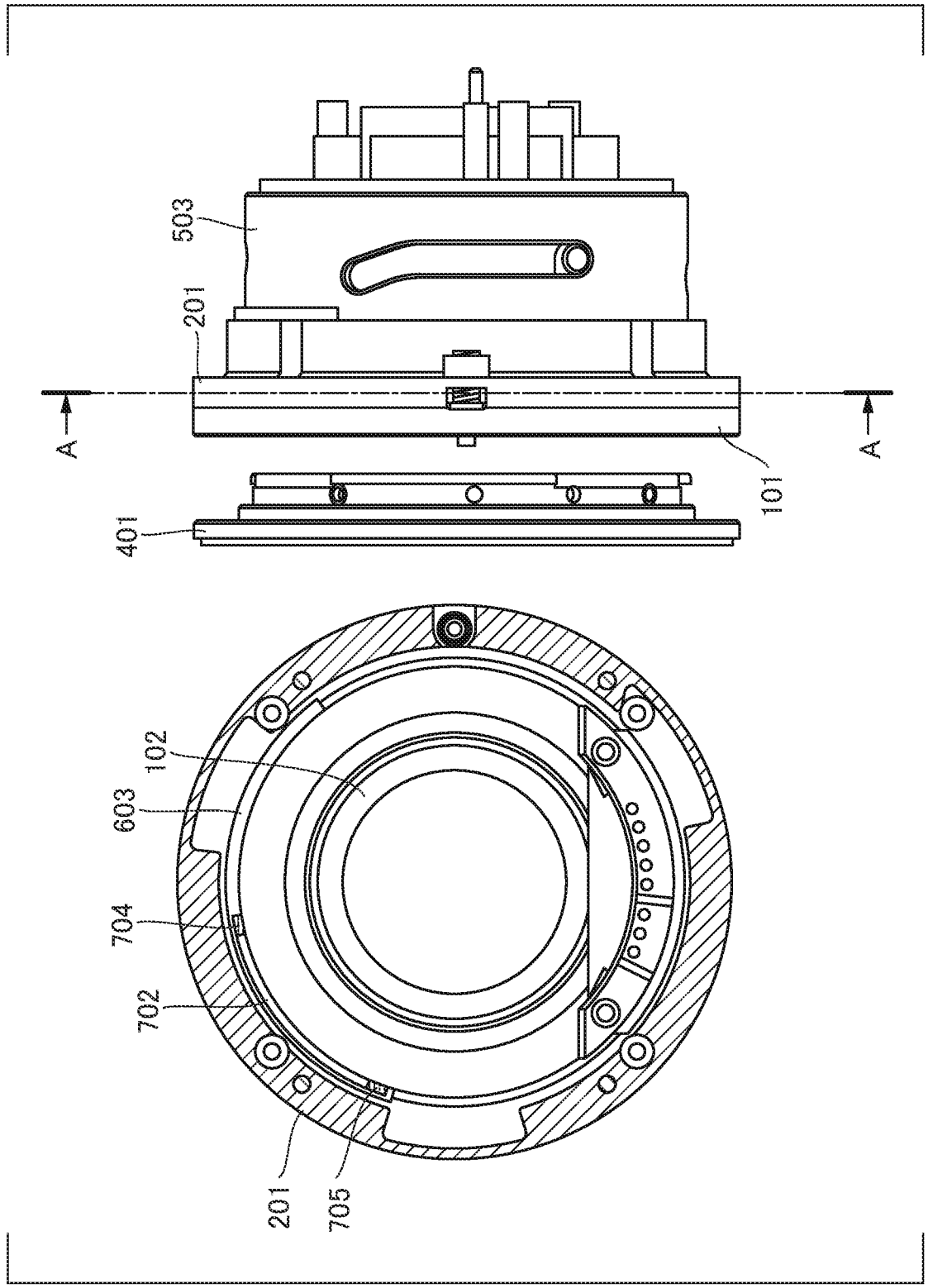
FIG. 10 is a diagram illustrating mounting of the interchangeable lens on the imaging device.

FIG. 10 illustrates a state where the interchangeable lens 2 is removed from the imaging device 1. FIG. 11 illustrates a state where the interchangeable lens 2 is mounted on the imaging device 1 and is not rotated. FIG. 12 illustrates a state where the interchangeable lens 2 is rotated until the interchangeable lens 2 is fixed. In addition, FIG. 13 is a diagram illustrating the development of the guide cam groove 703 provided in the cylindrical portion 701 of the converter lens driving member 503.

When the interchangeable lens 2 is mounted on the imaging device 1, the interchangeable lens 2 is brought closer to the imaging device 1 to engage with the bayonet claw portion 402 of the interchangeable lens 2 and the lens mounting portion 101 and the lens-side mounting member 401 of the interchangeable lens 2 abut on each other. In this case, the bayonet claw portion 402 of the interchangeable lens 2 engages with the bayonet claw engagement portion 702 of the converter lens driving member 503 (FIGS. 9 and 11).

When the interchangeable lens 2 is rotated clockwise with respect to the imaging device 1 when seen from a subject side centering on the optical axis 149, the abutting portion 403 of the bayonet claw portion 402 and the abutting portion 704 at the time of mounting of the bayonet claw engagement portion 702 are made to abut each other. Thereby, an operational force when the interchangeable lens 2 is mounted is transmitted to the converter lens driving member 503. When the interchangeable lens 2 is further rotated, the converter lens driving member 503 is rotated due to a force transmitted from the interchangeable lens 2. When the converter lens driving member 503 is rotated, the guide pin 502 of the converter lens holding member 501 is operated while sliding on the inner wall portion of the guide cam groove 703.

Figure 13:
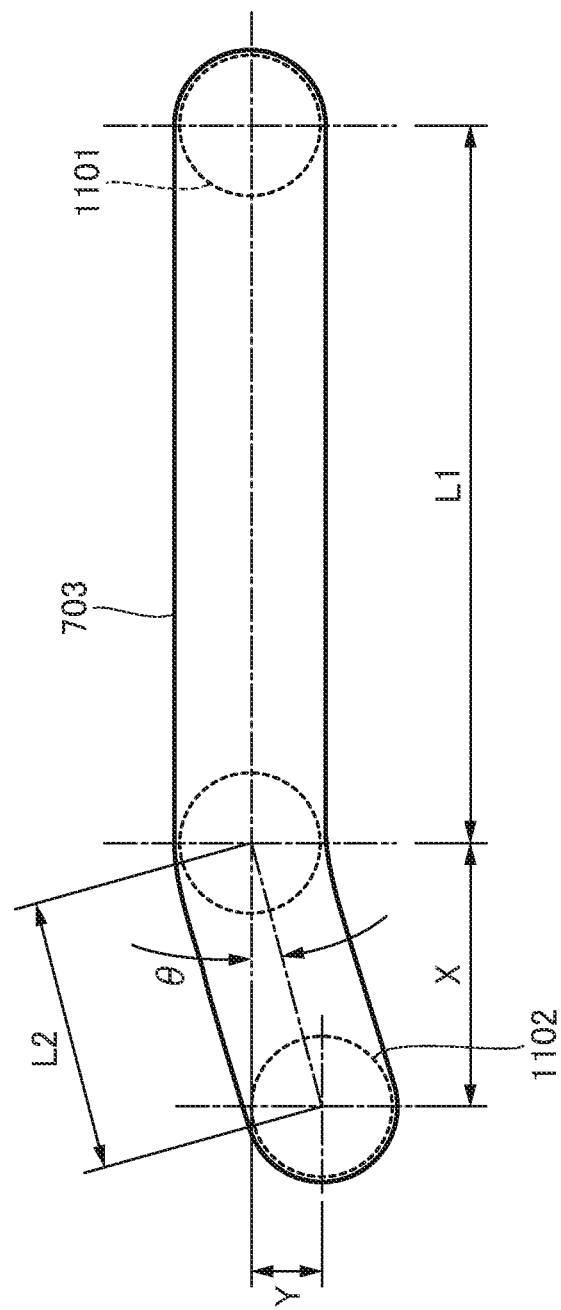
FIG. 13 is a diagram illustrating development of a guide cam groove provided in a converter lens driving member.

In a state in which the interchangeable lens 2 is removed from the imaging device 1, the guide pin 502 is positioned at a lens release point 1101 of the guide cam groove 703 illustrated in FIG. 13. The guide cam groove 703 includes a cam track L1 and a cam track L2. The cam track L1 has a first inner wall portion extending in a direction perpendicular to the optical axis. The cam track L2 is formed to be continuous with the cam track L1 and has a second inner wall portion extending while forming a predetermined angle with respect to the cam track L1.

In the guide cam groove 703, a cam groove central line is formed on the same surface as a plane perpendicular to the optical axis 149 in the cam track L1, and the guide pin 502 only slides on the first inner wall portion of the cam track L1. Therefore, since the converter lens holding member 501 is not operated while the guide pin 502 is operated along the cam track L1, the converter lens 102 fixed to the converter lens holding member 501 also does not operate, and the converter lens 102 is maintained at a position illustrated in FIG. 8A.

When the interchangeable lens 2 is further rotated, the guide pin 502 of the converter lens holding member 501 enters the cam track L2 (FIG. 13) formed to be continuous with the cam track L1. The cam track L2 is formed to form oblique sides of a circumferential direction moving distance X and an optical axis direction moving distance Y. Therefore, the guide pin 502 slides along the second inner wall portion of the cam track L2 in association with a rotation operation of the converter lens driving member 503, so that the converter lens holding member 501 is moved in the optical axis direction. When the interchangeable lens 2 is further rotated, the concave portion 404 of the interchangeable lens 2 reaches the locking portion 104 of the imaging device 1, and the interchangeable lens 2 is fixed to the imaging device 1. In this case, the guide pin 502 reaches a lens locking point 1102 of the guide cam groove 703, and the converter lens 102 fixed to the converter lens holding member 501 is disposed at a predetermined optical position (first position). The first position is an optical position where an image of a light flux from the converter lens 102 is formed on the imaging element 110. That is, when the mounting of the interchangeable lens 2 on the lens mounting portion 101 is completed, the converter lens 102 completes movement to the first position. With the above-described configuration, it is possible to move the converter lens 102 to the first position in the optical axis direction in association with a rotation operation when the interchangeable lens 2 is mounted.

If the interchangeable lens 2 is removed from the imaging device 1, the lens release button 124 is pressed, and the interchangeable lens 2 is rotated in a direction opposite to a direction when the interchangeable lens 2 is mounted, so that the respective members are driven in an order reverse to the above-described operations at the time of mounting, and thus the interchangeable lens 2 can be removed. Specifically, the cam track L2 moves the converter lens holding member 501 in the optical axis direction in association with a rotation operation of the converter lens driving member 503 when the interchangeable lens 2 is removed from the imaging device 1. That is, the guide pin 502 slides along the inner wall portion of the guide cam groove 703 in association with the rotation of the converter lens driving member 503 accompanying the rotation of the interchangeable lens 2, so that the converter lens holding member 501 is moved in the optical axis direction. Thereby, the converter lens 102 is retreated to a second position where an image of a light flux from the converter lens 102 is not formed on the imaging element 110. The second position is a position when the converter lens is moved from the above-described first position in a direction in which a light flux from an optical system expands.

Referring to FIG. 13, the guide cam groove 703 of the converter lens 102 will be described. As described above, in the guide cam groove 703, the cam track L1 in which the converter lens 102 is not moved and the cam track L2 in which the converter lens 102 is moved are formed to be continuous with each other. When the cam track L2 for driving the converter lens 102 is operated by the circumferential direction moving distance X, the converter lens 102 is operated in a direction of the optical axis 149 over the optical axis direction moving distance Y. In this case, it is preferable that the circumferential direction moving distance X be set as short as possible until immediately before the interchangeable lens 2 is mounted and in a range in which the converter lens 102 can be moved to a use position. With such a configuration, the converter lens 102 does not have an optical arrangement in an imaging state immediately before the interchangeable lens 2 is fixed to the imaging device 1. Thereby, it is possible to reduce a likelihood that the imaging element 110 will be burned due to sunlight incident on the imaging element 110, or the like even during an operation of mounting the interchangeable lens 2.

In addition, the optical axis direction moving distance Y determines the amount of retreat of the converter lens 102. When an angle θ formed between the cam track L2 and the circumferential direction moving distance X becomes larger, an operating load of the converter lens driving member 503 in the cam track L2 increases due to a component force. Therefore, it is preferable that the angle θ be appropriately determined by a balance amount between the amount of retreat, an operating load, and a locking position of the interchangeable lens 2.

Figure 14:
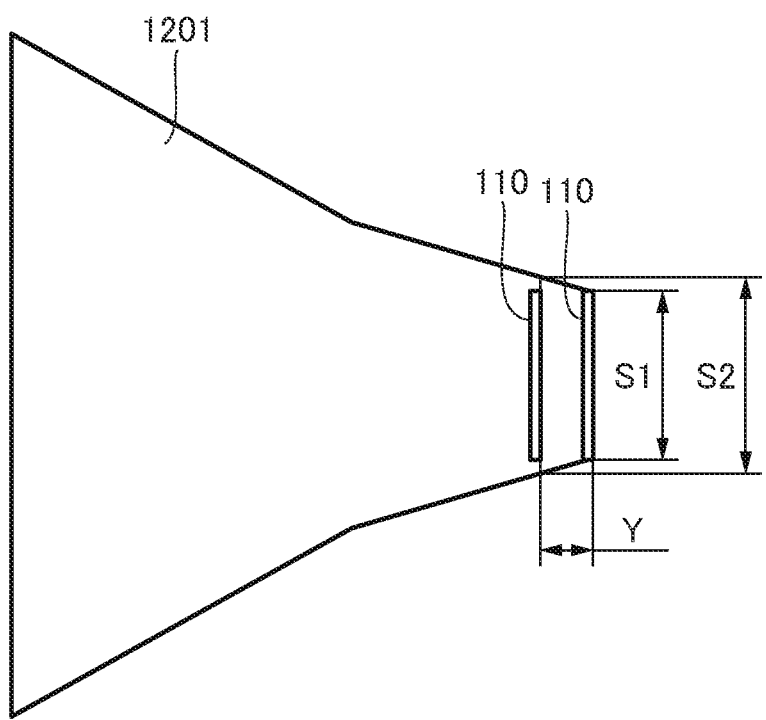
FIG. 14 is a diagram illustrating a relationship between a light flux from a converter lens and an imaging element.

FIG. 14 is a diagram illustrating a relationship between a light flux from a converter lens and an imaging element.

A light flux 1201 from the converter lens 102 includes a light flux converging on the imaging element 110 of the imaging device 1. When the converter lens 102 is exposed, there is a possibility that the performance of the imaging element 110 may be impaired due to the incidence of sunlight and the like on the converter lens 102 depending on use conditions other than imaging.

In the imaging device of the present embodiment, the converter lens 102 is moved in association with the interchangeable lens 2, and thus the light flux 1201 of which the image is formed by the imaging element 110 is moved to a position different from a position where an image was to be originally formed. Specifically, as illustrated in FIG. 14, the imaging element 110 is moved by the optical axis direction moving distance Y with respect to the light flux 1201 of the converter lens 102. In this case, a cut surface S2 of the light flux 1201 at the position of the imaging element 110 in a state where the interchangeable lens 2 is removed from the imaging device 1 is larger than a cut surface 51 of the light flux 1201 at the position of the imaging element 110 in a state where the interchangeable lens 2 is mounted on the imaging device 1. Therefore, an energy per unit area can be reduced. That is, the image forming position of the light flux 1201 of the converter lens 102 is moved, thereby reducing a likelihood that the imaging element 110 will be burned due to sunlight and the like incident on the imaging element 110. As described above, according to the imaging device of the present embodiment, it is possible to prevent the imaging element from being burned when an interchangeable lens is removed from the imaging device.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An imaging device comprising:
a mounting portion, which is a portion on which or from which an interchangeable lens is mountable or removable;
an imaging element; and
an optical system provided in a light path between the mounting portion and the imaging element,
wherein the optical system is disposed at a first position when the interchangeable lens is mounted on the mounting portion, and is moved to a second position in an optical axis direction, the second position being different from the first position, from the first position in association with an operation of removing the interchangeable lens from the mounting portion.

2. The imaging device according to claim 1, wherein the first position is a position where an image of the light flux from the optical system is formed on the imaging element, and
wherein the second position is a position where an image of the light flux from the optical system is not formed on the imaging element.

3. The imaging device according to claim 2, wherein the second position is a position when the optical system is moved from the first position in a direction in which the light flux from the optical system expands.

4. The imaging device according to claim 2, wherein movement of the optical system from the second position to the first position is completed in accordance with mounting of the interchangeable lens on the mounting portion being completed.

5. The imaging device according to claim 1, wherein the interchangeable lens is rotated centering on the optical axis when mounted on or removed from the mounting portion, and
wherein the imaging device further comprises an engagement portion which engages with a claw portion of the interchangeable lens using a bayonet system, and
wherein the optical system is movable in the optical axis direction in accordance with the engagement portion engaging with the claw portion of the interchangeable lens.

6. The imaging device according to claim 5, further comprising:
a driving member which drives the optical system in association with the rotation of the interchangeable lens;
a fixing member which fixes the mounting portion; and
a holding member which holds the optical system,
wherein the driving member includes the engagement portion and a cylindrical portion which is rotatably fitted to the fixing member.

7. The imaging device according to claim 6, wherein protrusion portions are provided at a plurality of locations at predetermined intervals on an outer circumferential surface of the holding member,
wherein first groove portions are provided at a plurality of locations at predetermined intervals in the fixing member,
wherein second groove portions are provided at a plurality of locations at predetermined intervals in the cylindrical portion included in the driving member, and
wherein the protrusion portion is inserted into the first groove portion and the second groove portion.

8. The imaging device according to claim 7, wherein the protrusion portion provided in the holding member slides along an inner wall portion of the second groove portion in accordance with the rotation of the driving member accompanying the rotation of the interchangeable lens, so that the holding member is moved in an optical axis direction.

9. The imaging device according to claim 8, wherein the second groove portion includes a first inner wall portion extending in a direction perpendicular to the optical axis and a second inner wall portion which is formed to be continuous with the first inner wall portion and extends while forming a predetermined angle with respect to the first inner wall portion, and
wherein the holding member is not moved in the optical axis direction if the protrusion portion slides along the first inner wall portion and is moved in the optical axis direction if the protrusion portion slides along the second inner wall portion.

10. The imaging device according to claim 1, wherein the optical system is a converter lens.

* * * * *